United States Patent [19]
Tucker

[11] 4,232,421
[45] Nov. 11, 1980

[54] ALTERNATIVE DIAMETER GASKET

[75] Inventor: James I. Tucker, Manhattan Beach, Calif.

[73] Assignee: Orion Industries, Inc., Compton, Calif.

[21] Appl. No.: 21,212

[22] Filed: Mar. 16, 1979

[51] Int. Cl.² ............................................. B65D 7/48
[52] U.S. Cl. ........................................ 16/2; 285/177; 285/162; 174/152 G
[58] Field of Search ...................... 16/2; 285/177, 162, 285/196, 338, 12; 174/152 G, 65 G, 153 G; 403/3

[56] References Cited
U.S. PATENT DOCUMENTS

| | | | |
|---|---|---|---|
| 1,800,578 | 4/1931 | Webb | 16/2 UX |
| 2,690,470 | 9/1954 | Moorhead | 174/153 G |
| 2,707,723 | 5/1955 | Moorhead | 174/153 G |
| 2,800,526 | 7/1957 | Moorhead | 174/153 G |
| 2,897,533 | 8/1959 | Bull et al. | 16/2 |

FOREIGN PATENT DOCUMENTS 1087207  8/1960 Fed. Rep. of Germany ...... 174/153 G

Primary Examiner—Andrew V. Kundrat
Attorney, Agent, or Firm—Fulwider, Patton, Rieber, Lee & Utecht

[57] ABSTRACT

An annular gasket is formed with a tubular sleeve of flexible material. At the interior surface of one end of the sleeve a lip is directed a short distance radially inwardly. At the opposite end of the sleeve, a recess is defined in the interior sleeve surface to receive the lip when the tubular sleeve is folded back upon itself to assume a generally toroidal configuration. The gasket interiorally receives cylindrical members of one diameter when the sleeve is in its extended condition and cylindrical members of a narrower diameter when in its toroidal configuration.

5 Claims, 4 Drawing Figures

ALTERNATIVE DIAMETER GASKET

BACKGROUND OF THE INVENTION

1. Field of the Invention

The present invention relates to annular sealing grommets and gaskets designed to form fluid tight seals between members to be joined.

2. Description of the Prior Art

In the past, numerous gasket and grommet configurations have been devised to effectuate fluid tight sealing between members at their junctions. Many such grommets are utilized in automotive vehicles, for example in joining fuel lines, oil lines and other fluid carrying conduits to more massive structures. Such gaskets and grommets are also used to form fluid tight seals between nonfluid connecting cords, such as electrical cords. A typical application in this regard involves the use of gaskets at both the ignition coil and the distributor cap in an automotive vehicle to prevent seepage of moisture into either of these engine components.

Unitl the present invention, gaskets and grommets have been sized in inner diameter according to the outer diameter of a particular size of conduit or cable which the gasket is designed to encompass, and in outer diameter according to the inner diameter of the larger structure with which the conduit or cable is to be joined. The gasket thus occupies an annular space between two joined structures in a manner so as to prevent the passage of any fluid between the outside diameter of the smaller structure and the inside diameter of the larger member.

Heretofore, the inner diameters of gaskets of this type have been specifically sized to accomodate a conduit or cable of a single outside diameter. Where alternative sizes of conduits might be joined in position to a larger structure, the provision of each alternative size conduit necessarily involves the provision of a different appropriately sized gasket.

SUMMARY OF THE INVENTION

According to the present invention, a single gasket is provided to have an alternative interior diameter size. This is achieved by constructing the gasket as a short tube or sleeve. The interior diameter of the tube or sleeve is sized to receive a conduit or cable having a particular size of outside diameter. Insertion of the conduit into the gasket will effectuate a fluid tight seal. In addition, however, by virtue of the unique structure of the gasket of the invention, the tubular sleeve may be folded back upon itself to assume a generally toriodal configuration. A portion of the outer surface of the sleeve, when the gasket is in its extended form, becomes the inner sealing gasket surface, sized to receive a cable or conduit of a different and smaller outer diameter.

The gasket of the invention is constructed with a lip at one end of the sleeve in its extended form, directed radially inwardly. A corresponding recess is defined to the inner surface of the sleeve at the opposite end thereof. The recess is configured to receive the lip so that the gasket, with the sleeve wall collapsed upon itself, remains in the toroidal configuration with the lip nesting in the recess. The gasket will remain in this toroidal posture despite longitudinal stresses that may act upon the cable or conduit passing therethrough and sealed therewithin.

The invention may be described with greater clarity and particularly by reference to the accompanying drawings.

DESCRIPTION OF THE EMBODIMENT

Figure 1:
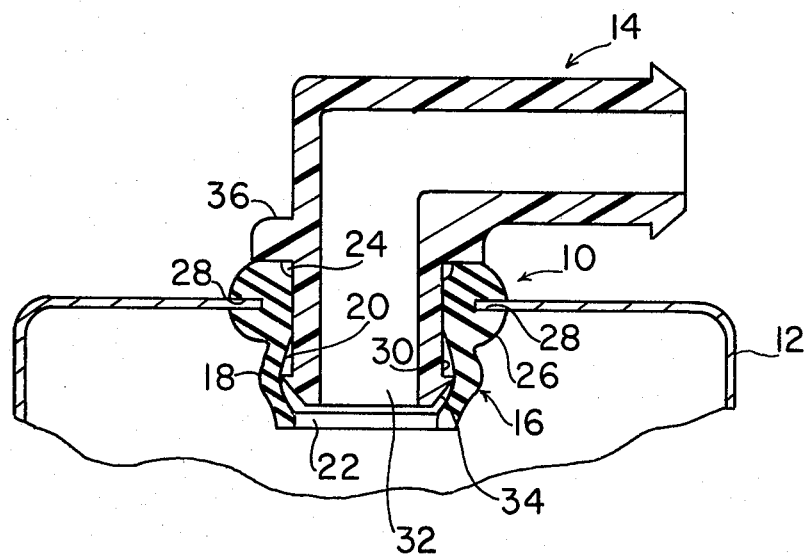
FIG. 1 is a side sectional view showing the gasket of the invention in use.
Figure 2:
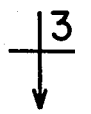
FIG. 2 is an enlarged view of the gasket of FIG. 1, illustrated in isolation.
Figure 2:
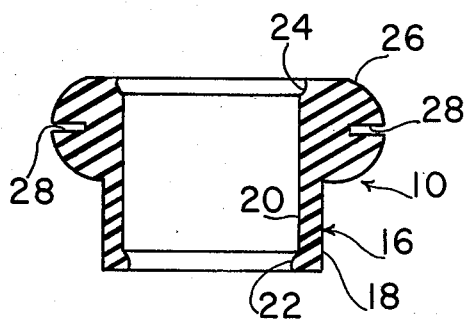
Figure 3:
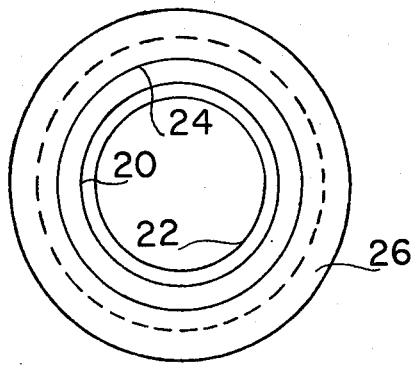
FIG. 3 is a plan view taken along the lines 3—3 of FIG. 2.

With reference to FIG. 1, a dual diameter gasket 10, constructed according to the present invention is shown in position to provide a fluid tight seal between a relatively large structure, such as a generally dome shaped oil cap 12 in an automotive vehicle, and a relatively narrow structure, such as the elbow shaped fume conduit member 14. With reference to FIG. 2, the gasket 10 is formed as a flexible cylindrical annular or tubular sleeve 16 having an outer cylindrical surface 18 and an inner cylindrical surface 20. At one end of the sleeve 16, at the inner surface 20, an annular lip 22 protrudes radially inwardly. At the opposite end of the sleeve 16 an annular recess 24 is formed in the inner surface 20 and is configured to receive the lip 22. Because of the mating geometry of the lip 22 and the recess 24, depicted separately in FIG. 2, the sleeve 16 can be collapsed upon itself, as depicted in FIG. 4, wherein the lip 22 is engaged in the recess 24.

As best illustrated in FIG. 2, the sleeve 16 is integrally formed with a thickened externally directed collar 26. An annular cleft in the outer surface of the collar 26 forms opposing shoulders 28 which define a radially inwardly directed channel and which are used to entrap the inwardly directed edges of the dome shaped oil cap 12 at the central circular aperture defined therein, as depicted in FIG. 1. The overhanging shoulders 28 reside in abutment on either side of the structure of the oil cap 12 and seat the gasket 10 to the oil cap 12 in fluid tight engagement.

The elbow shaped conduit 14 is likewise releasably sealed to the gasket 10 with the interior surface 20 of the gasket 10 residing in direct, fluid tight contact with the outer surface 30 of the annular end 32 of the elbow shaped conduit connector 14. The connector 14, at its end 32, is equipped with a fustrum shaped nose 34 at its end extremity, and an overhanging bearing ledge 36 longitudinally displaced therefrom. When inserting the relatively large diameter end 32 of the elbow conduit 14 into the gasket 10, the fustrum shaped nose 34 flexes the sleeve like tubular wall 16 of the gasket 10 radially outward to facilitate insertion of the end 32 of the elbow conduit 14 therein. The interior surface 20 of the sleeve 16 closes against the outer surface 30 of the end 32 as the nose 34 passes until the bearing ledge 36 resides in contact with the collar 26. In this position, depicted in FIG. 1, a fluid tight sealed engagement exists between the inner wall 20 of the gasket 10 and the outer wall 30 of the end 32 of the elbow conduit 14, and between the collar 26 and the oil cap 12.

Figure 4:
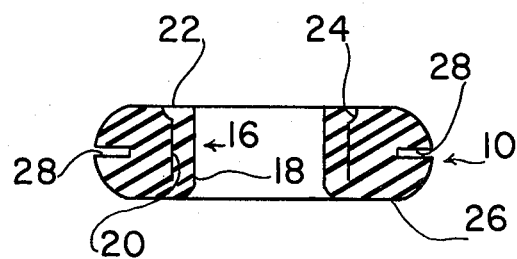
FIG. 4 shows the gasket of FIGS. 1-3 collapsed upon itself to accomodate a different size conduit.

When the gasket 10 is to accomodate a conduit connector of smaller diameter than that of the outer surface 30 of the elbow 14, the sleeve 16 is folded in upon itself to the collapsed position depicted in FIG. 4. The gasket 10 thereby assumes a donut or toroidal shape. The effective interior diameter of the gakset 10 is reduced by twice the wall thickness of the sleeve 16, since the sleeve 16 has been folded back upon itself throughout its diameter. In the folded position of the sleeve 16, illustrated in FIG. 4, the lip 22 resides within the recess 24. This interlock prevents the lip 22 from unseating from the recess 24 despite longitudinal stress exerted thereon. If stress is exerted upward, in FIG. 4, as by forcing a cylindrical connector into the gasket 10 from beneath, the lip 22 will not move appreciatably out of the recess 24, since the sleeve 16 will resist the stretching effect exerted upon it. If the gasket 10 is formed of rubber, this resistance is elastic, and despite any slight momentary longitudinal shifting of the lip 22, a removal of forces exerted thereon will allow the sleeve 16 to contract so that the lip 22 again seats in the recess 24.

If stresses are exerted in the other direction, downward in FIG. 4, the lip 22 bears in longitudinal abutment against the recess 24. This abutment prevents the lip 22 from unseating from the recess 24 when a cylindrical connector is entrapped within the gasket 10. This is because the lip 22 can be unseated from the recess 24 only when it is deflected radially inwardly so that it no longer resides in abutment in the recess 24. This cannot occur when a conduit is snugly encompassed within the gasket 10 in fluid tight sealing engagement therewith. With a conduit in such a disposition, fluid sealing engagement is formed at the portion of the surface 20 of the sleeve 16 that faces inwardly when the gasket 10 is collapsed to the donut configuration depicted in FIG. 4.

The gasket 10 is constructed of rubber or other flexible, resilient, elastic material. In construction, the thickness of the wall 16 is chosen to accomodate the particular diameter of the smaller conduit to be received by the gasket 10, while the diameter of the inner surface 20 is chosen to accomodate the diameter of the larger conduit to be received therein. The gasket 10 is utilized in its extended form, as depicted in FIG. 2 to receive a conduit of larger diameter, and is collapsed into the state depicted in FIG. 4 to receive a conduit of smaller diameter.

One suitable gasket constructed according to the present invention has a diameter at the interior surface 20 of 0.710 inches and a wall thickness of the sleeve 16 of 0.070 inches. The lip 22 protrudes from the wall 20 a distance of 0.035 inches, while the diameter across the recess 24 is 0.780 inches. The maximum outside diameter of the collar 26 is 1.20 inches while the diameter across the collar at the channel between shoulders 28 is 1.02 inches. The recess 24 extends axially along the wall 20 a distance of about 0.070 inches, while the lip 22 extends axially along the wall 20 a distance of 0.060 inches. The length of the sleeve 16 below the collar 26 is 0.340 inches, while the overall axial length of the collar 10 is 0.670 inches.

It should be understood that numerous modifications and variations to the grommet 10 can be made without departing from the scope of the invention. Innumerable alternative dimensional choices of construction of gasket 10 exist as do a wide variety of material choices. Accordingly, neither the form of construction, nor the manner of utilization depicted in the drawings should be construed as limiting to the scope of the invention. Rather, the invention is defined in the claims appended hereto.

I claim:

1. A dual diameter gasket formed as a flexible cylindrical annular sleeve having inner and outer surfaces with a uniform wall thickness therebetween and opposing ends, and said inner surface is of a uniform first diameter throughout its length, between said opposing ends, and an annular lip protrudes radially inwardly from said inner surface at one of said ends and an externally directed collar is integrally formed with said sleeve at the opposite end thereof and an annular recess configured to receive said lip is formed in said interior surface of said sleeve at said opposite end, whereby said sleeve is axially collapsible upon itself throughout its entire length into a toroidal shape and said lip is engageable in said recess and said sleeve has a uniform inner second diameter throughout its length in its collapsed state, and said second diameter is equal to said first diameter reduced by twice the wall thickness of said sleeve.

2. A gasket according to claim 1 further characterized in that said collar is formed with at least one exteriorally directed overhanging shoulder and integrally as a thickened portion of said sleeve.

3. A gasket according to claim 2 further characterized in that said collar is formed with a pair of exteriorally directed overhanging shoulders separated to define a channel for use in sealing in a circular opening.

4. A grommet adjustable to alternative larger and smaller interior diameters and constructed as a flexible, cylindrical annular tube having opposing ends and an interior wall and an exterior wall with a uniform wall thickness therebetween and having a lip directed radially inwardly from said interior wall at one end and having an integrally formed externally directed collar at the opposite end with a recess defined in said interior wall at the opposite end and configured to receive and restrain said lip from longitudinal movement, whereby said tube is alternatively utilized in longitudinally extended form wherein said interior wall defines said larger diameter which is uniform throughout the length thereof between said recess and said lip at said opposing ends, and in a form having said smaller interior diameter in which said tube is folded interiorally back upon itself throughout its entire length and into a toroidal shape with said lip residing in said recess and said smaller interior diameter is uniform throughout the entire length of the folded back structure and said smaller diameter is equal to said larger diameter reduced by twice the wall thickness of said sleeve.

5. A grommet according to claim 4 constructed of rubber.

* * * * *